United States Patent
Glückler et al.

(10) Patent No.: US 10,654,464 B2
(45) Date of Patent: May 19, 2020

(54) METHOD FOR COMPENSATING A SUPPORT TORQUE ON THE COMBUSTION ENGINE

(71) Applicant: ZF Friedrichshafen AG, Friedrichshafen (DE)

(72) Inventors: Johannes Glückler, Eriskrich (DE); Christian Mittelberger, Ravensburg (DE); Kai Bornträger, Langenargen (DE); Andreas Heinzler, Ravensburg (DE); Jochen Breuer, Tettnang (DE); Stefan Blattner, Vogt (DE); Thorsten Leim, Friedrichshafen (DE); Rick Hauschwitz, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 17 days.

(21) Appl. No.: 16/034,397

(22) Filed: Jul. 13, 2018

(65) Prior Publication Data
US 2019/0031016 A1 Jan. 31, 2019

(30) Foreign Application Priority Data
Jul. 26, 2017 (DE) .......................... 10 2017 212 859

(51) Int. Cl.
*B60W 20/15* (2016.01)
*B60W 20/00* (2016.01)
(Continued)

(52) U.S. Cl.
CPC ............. *B60W 20/00* (2013.01); *B60K 6/365* (2013.01); *B60K 6/485* (2013.01); *B60K 6/54* (2013.01); *B60W 10/06* (2013.01); *B60W 10/08* (2013.01); *B60W 30/188* (2013.01); *B60W 30/19* (2013.01); *F16H 3/091* (2013.01);
(Continued)

(58) Field of Classification Search
CPC ................. B60W 10/06; B60W 10/08; B60W 20/00–50; B60W 30/188; B60W 30/19
See application file for complete search history.

(56) References Cited

U.S. PATENT DOCUMENTS

2018/0319265 A1* 11/2018 Kaltenbach ............ B60K 6/365

FOREIGN PATENT DOCUMENTS

| EP | 3 165 389 A1 | 5/2017 |
| WO | 2017/076605 A1 | 5/2017 |

* cited by examiner

*Primary Examiner* — Erin D Bishop
(74) *Attorney, Agent, or Firm* — Davis & Bujold PLLC; Michael J. Bujold

(57) ABSTRACT

A method for compensation of a support torque at a combustion engine and transmission which provide an overlay of combustion engine and electric machine. The combustion engine, the electric machine, and a transmission gearset are connected with each other via a planetary gearset, which is positioned in front of a downstream transmission gearset. The invention concerns a transmission gearset of a three-shaft transmission, each with a transmission input shaft for the electric machine, and for the combustion engine, and an output shaft. For the connection or disconnection of the transmission input shaft of the electric machine while driving, the electric machine is used for the synchronization of the input shaft of the electric machine, and the created support torque at the combustion engine is determined, based on this support torque, to match a combustion engine torque and thus to compensate the support torque.

8 Claims, 3 Drawing Sheets

(51) Int. Cl.
  *B60W 10/06* (2006.01)
  *B60W 10/08* (2006.01)
  *B60W 30/19* (2012.01)
  *B60W 30/188* (2012.01)
  *B60K 6/365* (2007.10)
  *B60K 6/485* (2007.10)
  *B60K 6/54* (2007.10)
  *F16H 3/091* (2006.01)
  *F16H 3/12* (2006.01)
  *F16H 3/72* (2006.01)
  *F16H 37/04* (2006.01)
  *B60K 6/48* (2007.10)

(52) U.S. Cl.
  CPC ............... *F16H 3/126* (2013.01); *F16H 3/72* (2013.01); *B60K 2006/4825* (2013.01); *F16H 37/046* (2013.01); *F16H 2200/2007* (2013.01); *F16H 2200/2046* (2013.01); *F16H 2306/40* (2013.01)

METHOD FOR COMPENSATING A SUPPORT TORQUE ON THE COMBUSTION ENGINE

This application claims priority from German patent application serial no. 10 2017 212 859.3 filed Jul. 26, 2017.

FIELD OF THE INVENTION

The invention concerns a method for the compensation of a support torque on the combustion engine in transmissions which provide an overlay of the combustion engine and electric machine.

BACKGROUND OF THE INVENTION

Known are gear set arrangements which provide an overlay of the combustion engine and electric machine to create dedicated torques. As an example, the applicant names the EP 3165389 A1. In this, such overlay or interleaving, respectively, is shown. A transmission for a vehicle is presented with two, parallel partial transmissions configured as the main transmission, as well as with an output shaft, as well as two planetary gearsets which have elements like a carrier, sun gear, and a ring gear, whereby each partial transmission has a transmission input shaft, whereby a first transmission input shaft is designed as hollow shaft and a second transmission input shaft as solid shaft, whereby a second planetary gearset is positioned between an electric machine and the first transmission input shaft as a planetary stage. The electric machine is coupled to the sun gear of the planetary stage. The combustion engine is coupled to the ring gear of the planetary stage and the carrier of the planetary stage is designed as the drive for the downstream gearset. All shift elements of the main transmission are designed as claws.

When coupling the first transmission input shaft, the hollow shaft, while driving with the shift element I engaged in the EDA-mode, the following problem arises: the combustion engine is operated in any gear, for instance in the $7^{th}$ gear, in which the shift elements D, G, and S are engaged. The shift element I is active and connects the combustion engine with the planetary stage. The hollow shaft is not connected with its then downstream gearset. The shift elements A, B, and C are disengaged or in neutral position, respectively. If now the hollow shaft needs to be connected to the downstream gearset to shift to another gear, one of the shift elements A, B, or C must be synchronized with the help of the electric machine. Through the connection to the combustion engine via the planetary stage, an effective torque (support torque) is created during synchronization of the rotational speed at the electric machine and then at the combustion engine which results in an unwanted change of the desired combustion engine rotational speed. The driver feels this as a slight jerk in the vehicle and this means a loss of drive comfort.

During the disengagement of the hollow shaft while driving in the EDA-mode, the following problem can occur with the support torque of the electric machine: the combustion engine is operated as a starting position in any gear, whereby the hollow shaft is connected with its downstream gearset, for instance in the $9^{th}$ gear with the shift elements B, C, H, and S engaged. The shift element I is again active and connects the combustion engine with the planetary stage. The first transmission input shaft, the hollow shaft, is connected with its downstream gearset. If now the hollow shaft needs to be disconnected from its downstream gearset, the shift element B needs to be relieved of torque by means of the electric machine so that it can be disengaged. Through this connection to the combustion engine via the planetary stage, an active torque (support torque) is created by the electric machine at the combustion engine which causes a torque change at the transmission output. The driver notices that through a slide jerk in the vehicle and that means a loss of drive comfort.

SUMMARY OF THE INVENTION

The object of the present invention is to avoid the described problems during the engagement and disengagement of the transmission input shaft of the electric machine and thus to improve the drive comfort in transmissions with an overlay of the combustion engine and the electric machine.

The object is achieved in accordance with the invention through the independent claim.

A method is presented for the compensation of a support torque on the combustion engine in transmissions which provides an overlay of the combustion engine and the electric machine. These are three shaft transmissions, each with a transmission input shaft of the electric machine, and for the combustion engine, and an output shaft. The combustion engine, the electric machine, and the transmission are connected with each other via a planetary gearset. To engage or disengage the input shaft of the electric machine while driving, the electric machine is used to synchronize the input shaft of the electric machine. The resulting support torque on the combustion engine is hereby determined in order to adjust based on this, the torque at the combustion engine according to a kind of "bowl curve" by being reduced or increased and thus to compensate the support torque.

When connecting the transmission input shaft of the electric machine to the transmission gearset, the electric machine is accelerated and the support torque of the electric machine is first calculated. Thereafter, the effect of this support torque at a first element of the planetary gearset, with which the combustion engine is connected, is calculated. The support torque at the combustion engine is hereby determined.

During the disconnection of the input shaft of the electric machine with its then following transmission gearset, through disengagement of an engaged shift element, the torque is now present at the electric machine so that the engaged shift element of the transmission input shaft of the electric machine is load free.

The effect of the support torque of the electric machine at the first element of the planetary gearset, to which the combustion engine is connected to, is calculated through the mechanical coupling of the planetary gearset. The result is hereby the support torque on the combustion engine. Preferably, the first element of the planetary gearset is a ring gear. The electric machine is connected with a second element of the planetary gearset, preferably a sun gear, and a third element of the planetary gearset, preferably a planetary carrier, is connected with the transmission input shaft of the electric machine.

Alternatively, the interleaving can also look differently. Important is a three-shaft transmission with two inputs of the electric machine and the combustion engine and an output.

BRIEF DESCRIPTION OF THE DRAWINGS

In the following, the invention is explained in detail based on the associated drawings.

DETAILED DESCRIPTION OF THE PREFERRED EMBODIMENTS

Figure 1:
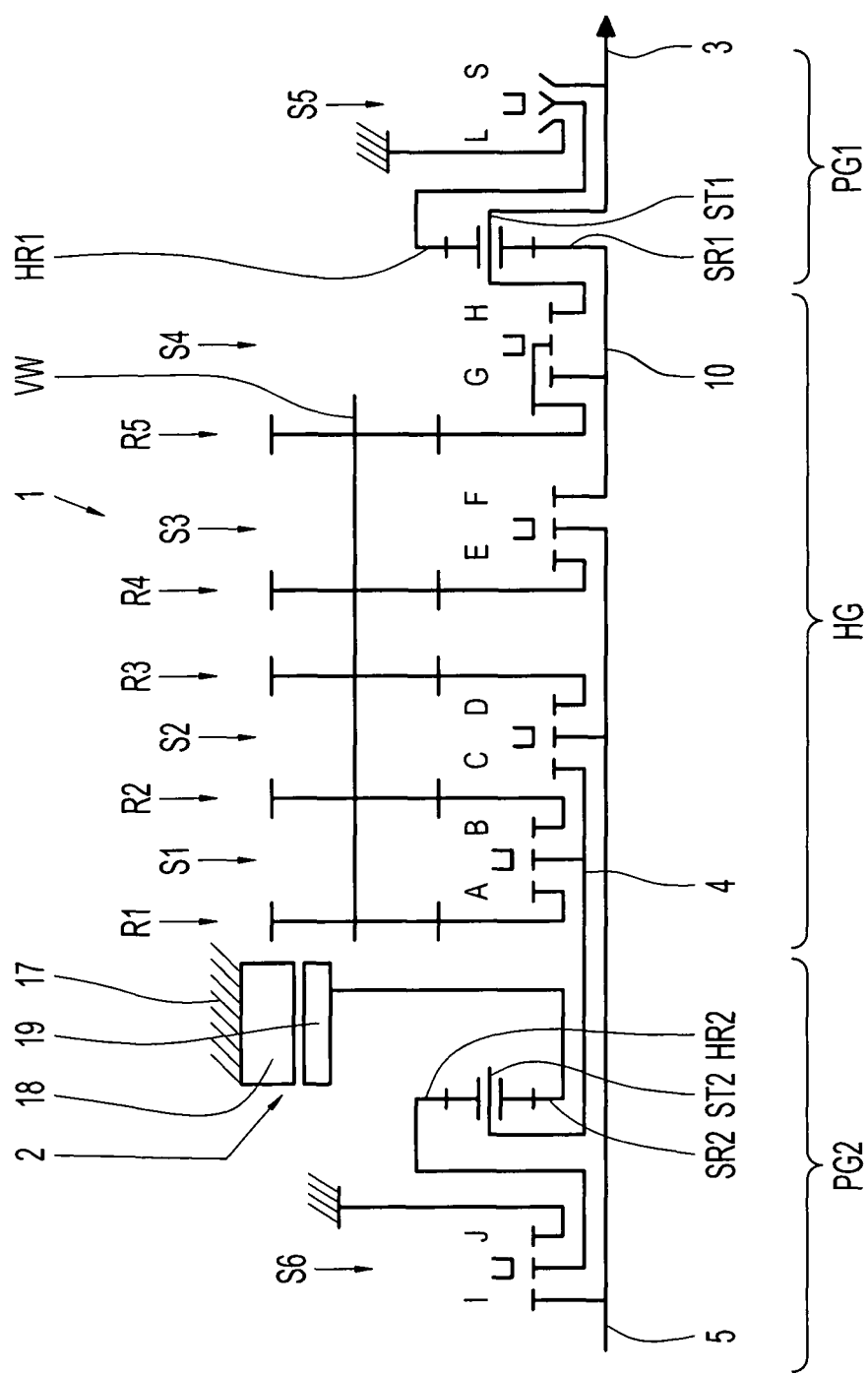
FIG. 1 Exemplary gearset which is used as an exemplary embodiment

Basically, transmissions are based on gearset configurations, which provide an overlay of combustion engine and an electric machine, to create specific torques at the output shaft of the transmission. The gearset shown in FIG. 1 presents such a gearset configuration with such interleaving.

The transmission 1 has an electric machine 2, with a 5-gear main transmission HG with two partial transmissions, with an output shaft 3, a first planetary gearset or planetary wheel set PG1, respectively, and a second planetary gearset or planetary wheel set PG2, respectively, each comprising the elements of a carrier ST1, ST2, at least one planetary gear PR1, PR2, a sun gear SR1, SR2, and a ring gear HR1, HR2. The first planetary gearset PG1 is applied as range group and is downstream of the main group HG. The second planetary gearset PG2 is positioned as a planetary stage between the electric machine 2 and the transmission input shaft of the electric machine 4. The transmission input shaft of the electric machine 4 is designed as a hollow shaft and is assigned to a first partial transmission of the main transmission HG. A second transmission input shaft 5 is designed as a solid shaft and assigned to the second partial transmission of the main transmission HG. The main transmission GH comprises a transmission gearset with five wheel planes R1-R5 and four shift elements S1-S4.

The main shaft 10 runs coaxial to the transmission input shaft 4, 5 and the output shaft 3, and is positioned between the second transmission input shaft 5 and the output shaft 3. The countershaft VW runs parallel to the axis of the transmission input shafts 4, 5, the main shaft 10, and the output shaft 3. Hereby, the first shift element S1, in its first shift position A and in its second shift position B, as well as the second shift element S2 in its first shift position C, can connect the transmission input shaft of the electric machine 4 with the main shaft HG or the transmission gearset of the main group HG, respectively.

The transmission 1 comprises a range group in the form of a first planetary gearset PG1 with an associated fifth shift element S5. The range group PG1 serves for the doubling of the number of gears of the main transmission HG. The second planetary gearset PG2 is positioned as planetary stage between an electric machine 2 and the first transmission input shaft of the electric machine 4. The electric machine 2 has a stator 18 which is connected in a rotationally fixed manner with a housing fixed component 17 or a transmission housing of the transmission 1, respectively, or with another rotationally fixed component of the transmission 1, so that the stator 18 is prevented from, rotating. A rotatably mounted rotor 19 of the electric machine 2 is rotatably fixed to a planetary gearset shaft of the planetary stage PG2, which is designed as a sun gear SR2 of the second planetary set PG2. The carrier ST2 of the second planetary gearset PG2 is rotatably fixed to the transmission input shaft of the electric machine 4. The ring gear HR2 of the second planetary gearset PG2 can be connected in a first shift position I to the second transmission input shaft, the transmission input shaft of the combustion engine 5, and can fixed to the housing in a second shift position J of the sixth shift element S6. In the first shift position I of the sixth shift element S6, the planetary stage PG2 functions as overlay transmission. In the second shift position J of the sixth shift element S6, the planetary stage PG2 functions as a fixed pre-transmission ratio for the electric machine 2.

Due to the arrangement of the electric machine 2 with the planetary stage PG2 on the transmission input shaft of the electric machine 4, the electric machine 2 is assigned to the first partial transmission. The second transmission input shaft 5 is driven by a second drive in the form of a combustion engine, not shown here. The combustion engine is therefore connected, or can be connected respectively, with the second partial transmission. Each partial transmission has also shiftable gears assigned through the associated wheel planes R1-R5. The first wheel plane R1 and the second wheel plane R2 of the main transmission HG are assigned to the transmission input shaft of the electric machine 4, therefore also to the first partial transmission of the main transmission HG. The third wheel plane R3 and the fourth wheel plane R4 of the main transmission HG are assigned to the transmission input shaft 5 of the combustion engine, therefore also to the second partial transmission of the main transmission HG. The fifth wheel plane R5 serves as the output constant for both partial transmissions of the main transmission HG. By means of the partial transmission connection via the second shift element S2 in the shift position C, the combustion engine can be connected with the electric machine 2.

The FIG. 1 shows just the upper half of the transmission 1 with its symmetrical gearset and the output shaft 3, which is in the axis of the transmission input shafts 4, 5, and the main shaft 10. The mirror image at this axis leads to a variation with two countershafts VW, which serve for the split of the power. The gearset is, however, functionally identical with the embodiment variation with just one countershaft VW. This means, that the countershaft VW is mirrored, including the associated fixed wheels.

With the embodiment in FIG. 1, in accordance with the invention, one can drive electro dynamically (EDx-Mode). The electric machine 2 can hereby be used for the support of the combustion engine for starting driving and acceleration. If the transmission 1 is operated in the EDx-Mode, electro dynamic shifting (EDS) is also possible, as a load shift function. Hereby and in the EDx-Mode, the sixth shift element S6 resides in its first shift position I. By way of the sixth shift element S6, the combustion engine is connected with the ring gear HR2 of the planetary gearset PG2. The carrier ST2 of the planetary gearset PG2 is the drive for the downstream gearsets of the main transmission HG and functions as transmission input shaft of the electric machine 4 into the downstream transmissions gearset of the main transmission HG. The shift elements S1, S2, S3, S4, S6 of the main transmission HG and the planetary stage PG2 are designed has claws.

Alternatively, the interleaving can also look differently. Important is the three-shaft transmission gearset with two inputs, one for the electric machine and one for the combustion engine, and one for the output.

If, in the case of the transmission 1 in the EDx-Mode in FIG. 1, the transmission input shaft of the electric machine 4 needs to be coupled to the transmission gearset of the main transmission HG, the electric machine 2 is used for the synchronization. The electric machine 2 is hereby accelerated, the rotational speed of the electric machine 2 is now increased. In the next step, the dynamic torque of the electric machine 2, the support torque, is calculated and its effect at the ring gear is calculated, which is connected with the combustion engine. This takes place through a mechanical coupling of the planetary gearset. In example shown here, the support torque decreases due to the connection of the components to the second planetary gearset PG2 with the electric machine 2 at the sun gear SR2 and a ratio i≈−2.1. The torque at the combustion engine is accordingly reduced (see FIG. 2) to a kind of "bowl curve", so that the support torque is compensated. At the output, nothing will be noticed during the shifting and a consistent drive comfort is generated.

During the disengagement procedure, the electric machine 2 is already connected with the transmission gearset of the main transmission HG. One of the shift elements S1 or S2, or the connection of the transmission input shaft of the electric machine 4 with the transmission gearset of the main transmission HG, is therefore coupled and needs to be made torque-free. Therefore, torque acts upon the electric machine 2, so that the shift element becomes load free. The support torque at the combustion engine is determined through a mechanical coupling of the planetary set. In the example shown here, this support torque decreases due to the connection of the components the second planetary gearset PG2 with the electric machine 2 at the sun gear SR2, and a gear ratio i≈−2.1. The torque at the combustion engine is accordingly (see FIG. 3) reduced in a kind of "bowl curve" or increased, so that the support torque is compensated. At the output, nothing is noticeable during the shift and a consistent ride comfort is generated.

Figure 2:
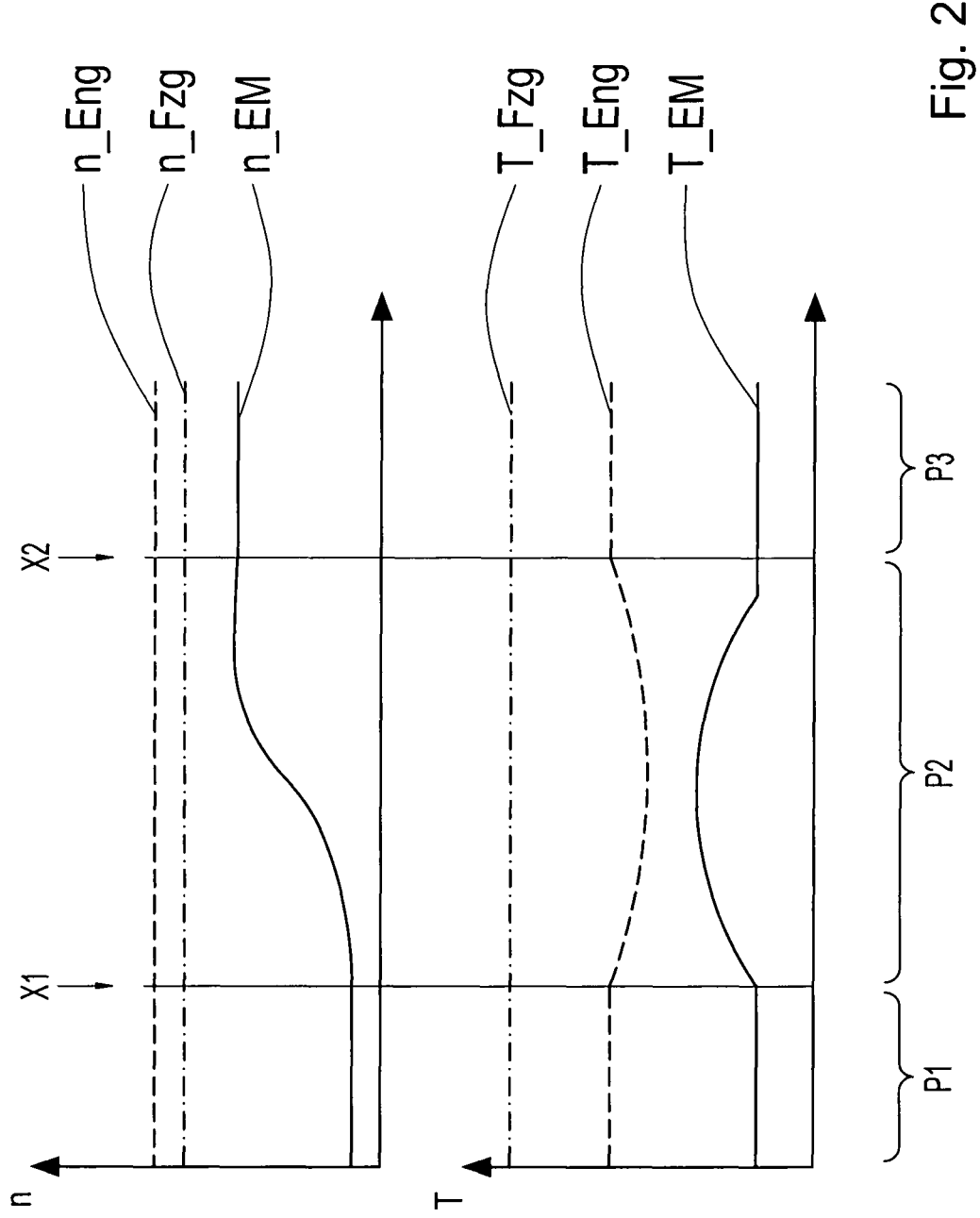
FIG. 2 Diagram for compensation during the coupling procedure

The method, in accordance with the invention, will now be described in further detail with reference to the exemplary diagrams in FIG. 2 and FIG. 3 and in the exemplary graphs. FIG. 2 shows the graph and the compensation during the coupling procedure. At the beginning of the coupling procedure, in the phase 1 of the coupling procedure, a gear with a de-coupled transmission input shaft of the electric machine 4 is engaged and the vehicle drives constantly. The motor rotational speed n_Eng, which corresponds to the rotational speed at the ring gear HR2, and the vehicle speed n-Fzg, which corresponds to the rotation speed at the transmission output, are constant. The associated vehicle torque T_Fzg, torque at the transmission output, and the motor torque T_Eng, torque at the ring gear HR2, are also constant in the first phase P1. If now, and at first time point X1, the electric machine 2 needs to be coupled through the transmission input shaft 4 of the electric machine, the electric machine 2 is used for the synchronization. This can be seen in the graph in phase 2 P2. The electric machine 2 is accelerated. Thus, the rotational speed of the electric machine n_EM increases until the shift element which needs to be shifted is synchronized and remains at this level. A support torque is created at the electric machine 2, which is why the torque of the electric machine T_EM increases. To counteract this, the motor torque T_Eng is reduced accordingly. Thus and as shown in Phase 2 P2, the vehicle torque can be held constant. At the second time point X2, the shift element to be decoupled is synchronized and coupled. The phase 3 P3 of the graph shows a constant, continuing course of the torques T_Eng, T_Fzg, and T_EM, and of the rotational speeds n_Eng, n_Fzg, and n_EM during a coupled electric machine 2 through the transmission input shaft 4 of the electric machine.

Figure 3:
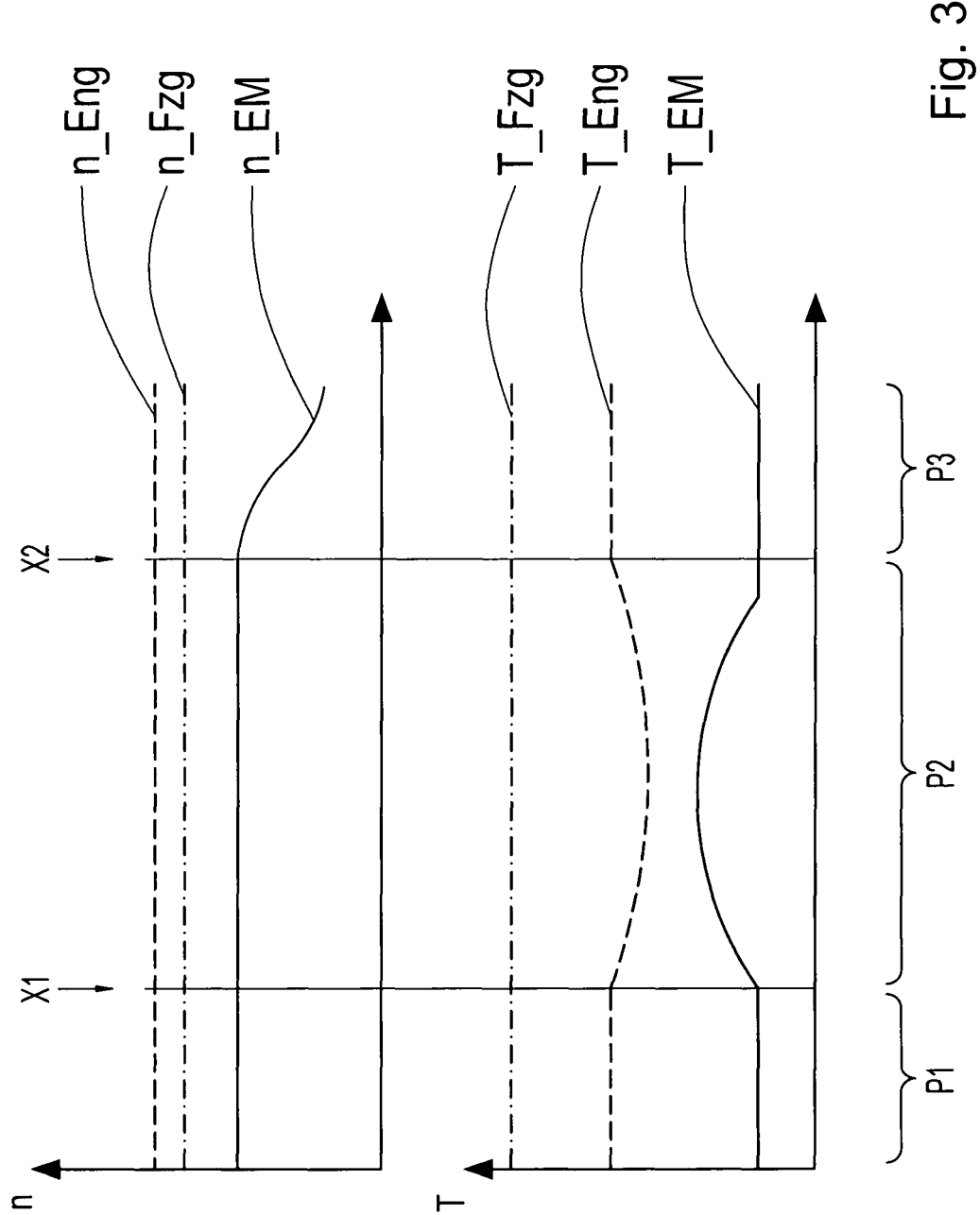
FIG. 3 Diagram for compensation during the decoupling procedure

The de-coupling procedure is further presented in FIG. 3. At the beginning of the de-coupling procedure, in phase 1 of the de-coupling procedure, a gear is engaged with a coupled transmission input shaft of the electric machine 4, and the vehicle has a constant drive. The motor rotational speed n_Eng, which corresponds to the rotational speed at the ring gear HR2, and the vehicle speed n_Fzg, which corresponds to the rotational speed of the transmission output, are constant. The associated vehicle torque T_Fzg, torque at the transmission output, and the motor torque T_Eng, torque at the ring gear HR2, are also constant in the phase 1. If the electric machine 2 is to be de-coupled via the transmission input shaft of the electric machine 4 at a first time point X1, in turn the electric machine 2 is again used for the synchronization. This can be seen in the phase 2 P2 of the graph. The torque of the electric machine T_EM is increased until the shift element to be de-coupled is load free. This support torque is determined and the motor torque T_Eng is reduced accordingly. Thus and as seen in phase 2 P2, the vehicle torque T_Fzg can be held constant. Also, the rotational speeds n_Eng, n_Fzg, and n_EM, the rotational speed of the electric machine, remain constant. At the second time point X2, the shift element which needs to be de-coupled is load free and de-coupled. The phase 3 of the graph shows the constant, continuing course of the torques T_Eng, T_Fzg, and T_EM and the rotational speeds n_Eng, n_Fzg, and n_EM when the electric machine 2 is de-coupled from the transmission input shaft of the electric machine 4.

REFERENCE CHARACTERS

1 Transmission
2 Electric Machine
3 Output Shaft
4 Transmission Input Shaft of the Electric Machine
5 Transmission Input Shaft of the Combustion Engine
10 Main Shaft
17 Enclosure-fixed Part
18 Stator
19 Rotor
R1 First Wheel Plane
R2 Second Wheel Plane
R3 Third Wheel Plane
R4 Fourth Wheel Plane
R5 Fifth Wheel Plane
S1 First Shift Element
S2 Second Shift Element
S3 Third Shift Element
S4 Fourth Shift Element
S5 Fifth Shift Element
S6 Sixth Shift Element
HG Main Transmission
PG1 First Planetary Gearset, Range Group
PG2 Second Planetary Gearset, Planetary Stage
HR1, HR2 Ring Gear
ST1, ST2 Carrier
N Rotation Speed
T Torque
P1 Phase 1
P2 Phase 2
P3 Phase 3
X1 First Time Point
X2 Second Time Point
n_Eng Motor Rotation Speed
n_Fzg Vehicle Rotation Speed
n_EM Rotation Speed of the Electric Machine
T_Fzg Vehicle Torque
T_Eng Motor Torque
T_EM Torque of the Electric Machine

The invention claimed is:
1. A method for compensation of a support torque at a combustion engine;

wherein the combustion engine, an electric machine, and a transmission gearset of a transmission are connected with each other via a planetary gearset, which is positioned upstream of the transmission gearset;

whereby the method concerns the transmission, the transmission comprising a three-shaft transmission having a transmission input shaft for the electric machine, a transmission input shaft for the combustion engine, and an output shaft, the method comprising:

when connecting or disconnecting the transmission input shaft for the electric machine during a drive, using the electric machine for synchronization of a rotational speed at with at least one shifting element;

determining the support torque at the combustion engine; and matching, based on the support torque, a combustion engine torque by adjusting the combustion engine torque to compensate for the support torque.

2. The method for the compensation of the support torque at the combustion engine according to claim 1, further comprising matching the combustion engine torque in accordance with a bowl-shaped curve.

3. The method for the compensation of the support torque at the combustion engine according to claim 1, further comprising facilitating the matching of the combustion engine torque either via a reduction of the combustion engine torque or via an increase of the combustion engine torque.

4. The method for the compensation of the support torque at the combustion engine according to claim 1, further comprising for the connection of the transmission input shaft for the electric machine with the transmission gearset, accelerating the electric machine at a dynamic support torque of the electric machine and, thereafter, calculating an effect of the dynamic support torque on the combustion engine torque.

5. The method for the compensation of the support torque at the combustion engine according to claim 1, further comprising disconnecting the at least one shifting element for disconnection of the transmission input shaft for the electric machine from the downstream transmission gearset by acting on the electric machine with the support torque such that the at least one shifting element of the transmission input shaft for the electric machine becomes load free.

6. The method for the compensation of the support torque at the combustion engine according to claim 1, further comprising calculating the support torque at a first element of the planetary gearset.

7. The method for the compensation of the support torque at the combustion engine according to claim 1, further comprising connecting the combustion engine with a first element of the planetary gearset which is a ring gear of the planetary gearset.

8. The method for the compensation of the support torque at the combustion engine according to claim 1, further comprising:

connecting the electric machine with a sun gear of the planetary gearset, and connecting a planetary carrier of the planetary gearset with the transmission input shaft for the electric machine.

* * * * *